(12) United States Patent
Nama et al.

(10) Patent No.: US 9,356,764 B2
(45) Date of Patent: May 31, 2016

(54) HYBRID JOINT PROCESSING FOR USE IN A RADIO ACCESS NETWORK

(71) Applicant: SPIDERCLOUD WIRELESS, INC., San Jose, CA (US)

(72) Inventors: Hithesh Nama, San Jose, CA (US); Pete Worters, San Carlos, CA (US); Gopal Harikumar, Fremont, CA (US)

(73) Assignee: SPIDERCLOUD WIRELESS, INC., San Jose, CA (US)

( * ) Notice: Subject to any disclaimer, the term of this patent is extended or adjusted under 35 U.S.C. 154(b) by 180 days.

(21) Appl. No.: 13/950,343

(22) Filed: Jul. 25, 2013

(65) Prior Publication Data

US 2015/0029944 A1  Jan. 29, 2015

(51) Int. Cl.
*H04W 4/00* (2009.01)
*H04L 5/00* (2006.01)

(52) U.S. Cl.
CPC ............ *H04L 5/0091* (2013.01); *H04L 5/0035* (2013.01); *H04L 5/0073* (2013.01)

(58) Field of Classification Search
CPC .................. H04L 5/0091; H04W 72/0426
See application file for complete search history.

(56) References Cited

U.S. PATENT DOCUMENTS

| | | | |
|---|---|---|---|
| 8,885,545 B2 * | 11/2014 | Aminaka | 370/315 |
| 2013/0017852 A1 * | 1/2013 | Liu et al. | 455/509 |
| 2013/0021925 A1 * | 1/2013 | Yin et al. | 370/252 |
| 2013/0166644 A1 * | 6/2013 | Sun et al. | 709/204 |

* cited by examiner

*Primary Examiner* — David Oveissi
(74) *Attorney, Agent, or Firm* — Stuart H. Mayer; Mark D. Wieczorek; Mayer & Williams PC

(57) ABSTRACT

A method of joint processing of data in a radio access network (RAN) that includes a plurality of radio nodes each associated with a cell and a services node operatively coupled to the radio nodes is provided. The services node provides connectivity to a core network. The method includes determining that a plurality of first UEs (User Equipment) each being serviced by a selected set of the cells is to operate in accordance with a hybrid joint processing scheme. Information is transferred between the plurality of first UEs and the radio nodes in accordance with the hybrid joint processing scheme by performing L1 layer processing on the radio nodes and L2 layer processing at the services node.

24 Claims, 7 Drawing Sheets

US 9,356,764 B2

HYBRID JOINT PROCESSING FOR USE IN A RADIO ACCESS NETWORK

BACKGROUND

Operators of mobile systems such as Universal Mobile Telecommunications Systems (UMTS) are increasingly relying on wireless small cell radio access networks (RANs) in order to deploy indoor voice and data services to enterprises and other customers. Such small cell RANs typically utilize multiple-access technologies capable of supporting communications with multiple users using radio frequency (RF) signals and sharing available system resources such as bandwidth and transmit power. While such small cell RANs operate satisfactorily in many applications, there exists a need for further improvements in small cell RAN technologies.

For example, one problem with small cell RANs is that inter-cell interference prevents these systems from coming close to their theoretical data rates for multi-cell networks. Such interference arises because the same spectral resources are used in different cells, leading to interference for terminals (e.g., User Equipment) located at the edge between cells. Release 11 of the 3GPP Long Term Evolution (LTE) specifications proposes the use of Coordinated Multi-Point (CoMP) technology to mitigate problems caused by inter-cell interference. One aspect of CoMP technology involves the scheduling of time-frequency resources by cells in a cooperative manner. The use of CoMP technology generally comes at the cost of increased demand on the backhaul (high capacity and low latency), higher complexity, increased synchronization requirements and so on.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A radio access network, such as an LTE Enterprise Radio Access Network (E-RAN), employs a hierarchical architecture that includes a services node that provides connectivity between the radio nodes in the RAN and a core network. The RAN may employ a modification to a joint processing scheme in which downlink data for a given UE is available in a given time-frequency resource (e.g., a resource block) from more than one transmitting cell while multiple cells receive the same uplink data from a single UE on a given time-frequency resource. As modified, a hybrid joint processing scheme is employed in which data protocol processing is split between the radio nodes and the services node.

In one embodiment, hybrid joint processing is used in connection with cell-edge UEs but not cell-interior UEs. In this embodiment, the L2 protocol stack (PDCP/RLC/MAC) may be hosted on the services node for cell-edge UEs while the L1 processing (PHY) remains on the radio nodes. Such data protocol processing can be dynamically moved between the services node and radio nodes as a UE moves from the interior of a cell to the edge of a cell, and vice versa.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
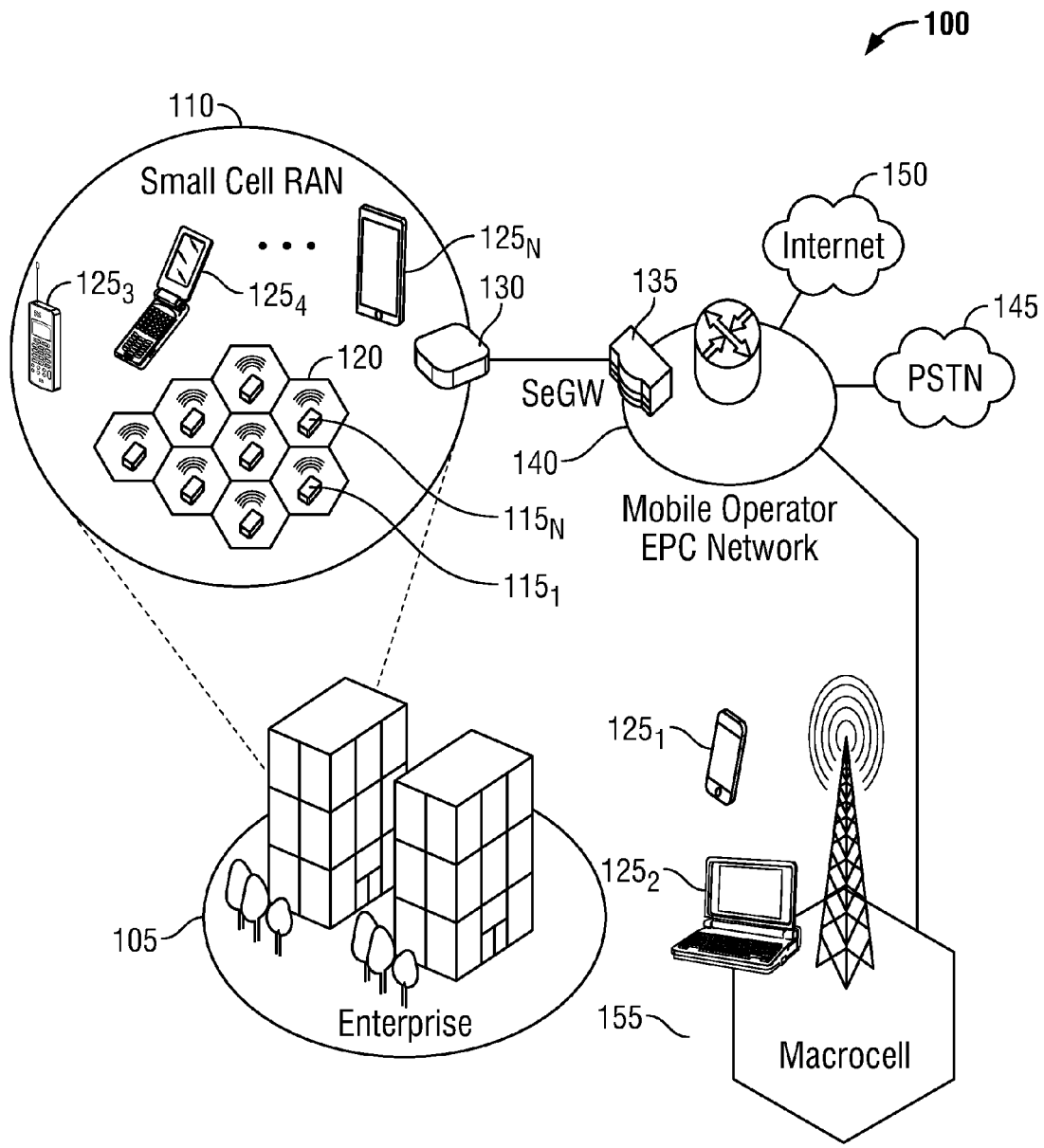
FIG. 1 shows an illustrative mobile telecommunications environment in which the present invention be practiced.

FIG. 1 shows an illustrative mobile telecommunications environment 100 in which the present invention be practiced. The mobile telecommunications environment 100, in this illustrative example, is arranged as an LTE (Long Term Evolution) system as described by the Third Generation Partnership Project (3GPP) as an evolution of the GSM/UMTS standards (Global System for Mobile communication/Universal Mobile Telecommunications System). It is emphasized, however, that the present principles described herein may also be applicable to other network types and protocols. The environment 100 includes an enterprise 105 in which a small cell RAN 110 is implemented. The small cell RAN 110 includes a plurality of radio nodes (RNs) 115$_1$ ... N. Each radio node 115 has a radio coverage area (graphically depicted in the drawings as a hexagonal shape) that is commonly termed a small cell. A small cell may also be referred to as a femtocell, or using terminology defined by 3GPP as a Home Evolved Node B (HeNB). In the description that follows, the term "cell" typically means the combination of a radio node and its radio coverage area unless otherwise indicated. A representative cell is indicated by reference numeral 120 in FIG. 1.

The size of the enterprise 105 and the number of cells deployed in the small cell RAN 110 may vary. In typical implementations, the enterprise 105 can be from 50,000 to 500,000 square feet and encompass multiple floors and the small cell RAN 110 may support hundreds to thousands of users using mobile communication platforms such as mobile phones, smartphones, tablet computing devices, and the like (referred to as "user equipment" (UE) and indicated by reference numerals 125 1-N in FIG. 1). However, the foregoing is intended to be illustrative and the solutions described herein can be typically expected to be readily scalable either upwards or downwards as the needs of a particular usage scenario demand.

In this particular illustrative example, the small cell RAN 110 includes one or more services nodes (represented as a single services node 130 in FIG. 1) that manage and control the radio nodes 115. In alternative implementations, the management and control functionality may be incorporated into a radio node, distributed among nodes, or implemented remotely (i.e., using infrastructure external to the small cell RAN 110). The radio nodes 115 are coupled to the services node 130 over a direct or local area network (LAN) connection (not shown in FIG. 1) typically using secure IPsec tunnels. The services node 130 aggregates voice and data traffic from the radio nodes 115 and provides connectivity over an IPsec tunnel to a security gateway SeGW 135 in an Evolved Packet Core (EPC) 140 network of a mobile operator. The EPC 140 is typically configured to communicate with a public switched telephone network (PSTN) 145 to carry circuit-switched traffic, as well as for communicating with an external packet-switched network such as the Internet 150.

The environment 100 also generally includes Evolved Node B (eNB) base stations, or "macrocells", as representatively indicated by reference numeral 155 in FIG. 1. The radio coverage area of the macrocell 155 is typically much larger than that of a small cell where the extent of coverage often depends on the base station configuration and surrounding geography. Thus, a given UE 125 may achieve connectivity to the network 140 through either a macrocell or small cell in the environment 100.

Figure 2:
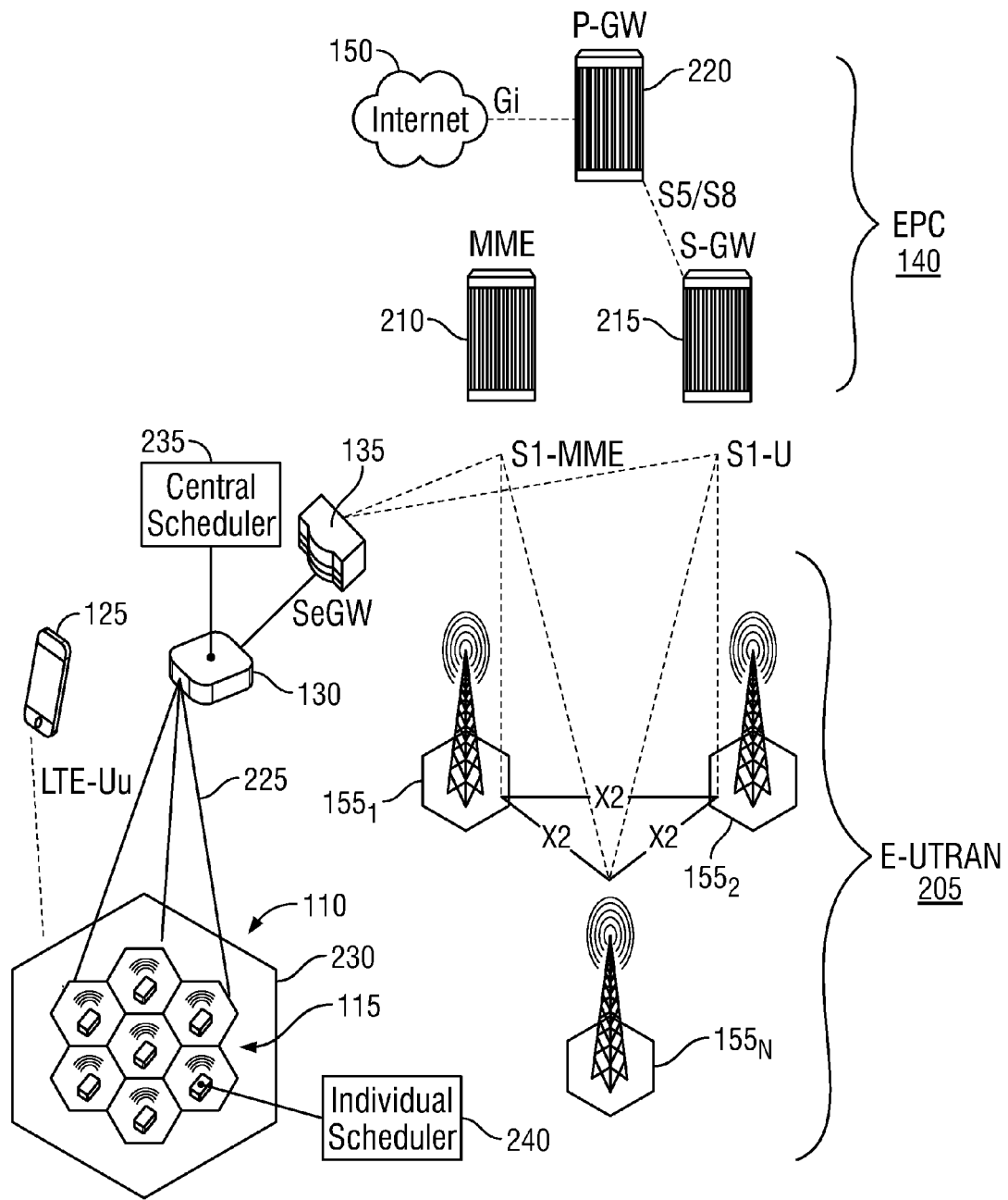
FIG. 2 shows details of an EPC (Evolved Packet Core) and E-UTRAN (Evolved UMTS Terrestrial Radio Access Network, where UMTS is an acronym for Universal Mobile Telecommunications System) arranged under LTE (Long Term Evolution) with which a small cell network may interoperate.

Along with macrocells 155, the small cell RAN 110 forms an access network, i.e., an Evolved UMTS Terrestrial Radio Access Network (E-UTRAN) under 3GPP as represented by reference numeral 205 in FIG. 2. As shown, there is no centralized controller in the E-UTRAN 205, hence an LTE network architecture is commonly said to be "flat." The macrocells 155 are typically interconnected using an X2 interface and to the EPC 140 by means of an S1 interface. More particularly, the macrocells are connected to the MME (Mobility Management Entity) 210 in the EPC 140 using an S1-MME interface and to the S-GW (Serving Gateway) 215 using an S1-U interface. An S5 interface couples the S-GW 215 to a P-GW (Packet Data Network Gateway) 220 in the EPC 140 to provide the UE 125 with connectivity to the Internet 150. A UE 125 connects to the radio nodes 115 over an LTE-Uu interface.

The SeGW 135 is also connected to the MME 210 and S-GW 215 in the EPC 140 using the appropriate S1 connections. Accordingly, as each of radio nodes 115 in the small cell RAN 110 is operatively coupled to the services node 130 (as representatively shown by lines 225), the connections from the radio nodes 115 to the EPC 140 are aggregated to the EPC 140. Such aggregation preserves the flat characteristics of the LTE network while reducing the number of S1 connections that would otherwise be presented to the EPC 140. The small cell RAN 110 thus essentially appears as a single eNB 230 to the EPC 140, as shown.

The services node includes a central scheduler 235 as shown in FIG. 2. The radio nodes 115 may also be configured to support individual schedulers (representatively indicated by reference numeral 240 in FIG. 2). The operation of the schedulers is discussed below in connection with FIG. 7.

Figure 3:
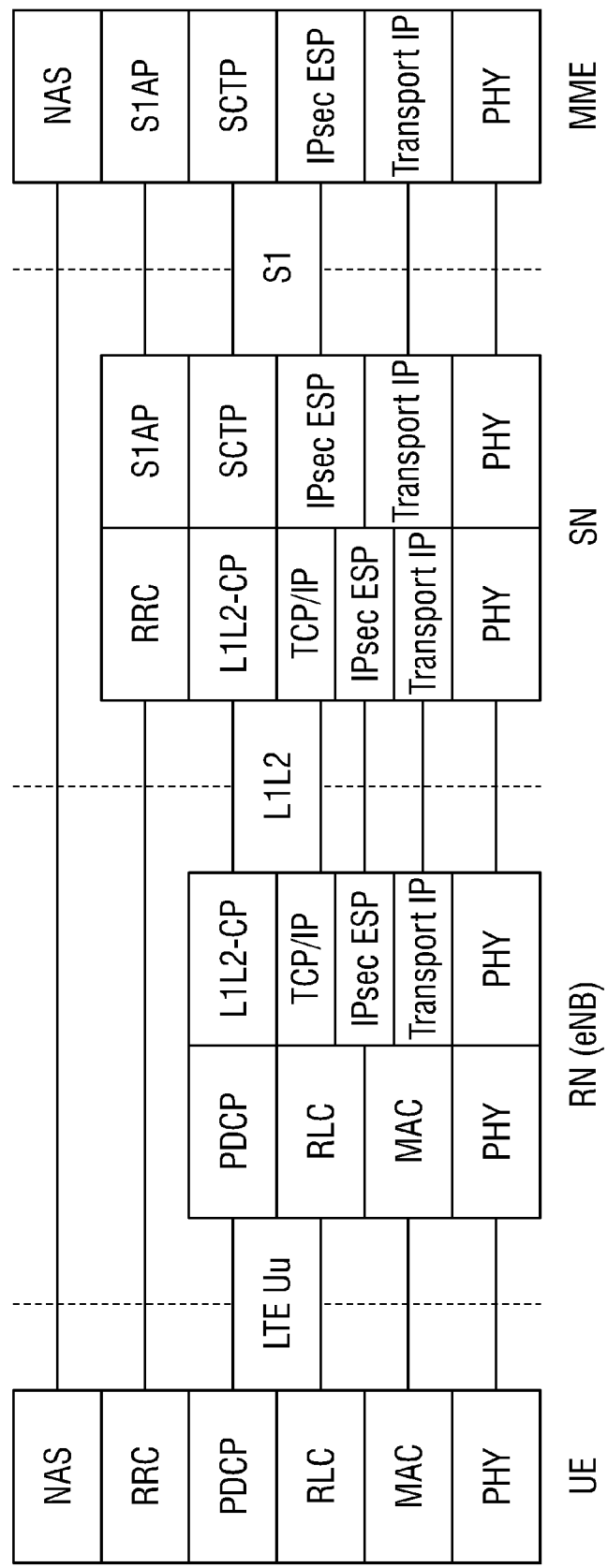
FIGS. 3 and 4 shows one example of a protocol stack that may be employed for the control plane and the user plane, respectively, used in the system of FIGS. 1 and 2 in terms of the OSI (Open Systems Interconnection) model of logical layers.
Figure 4:
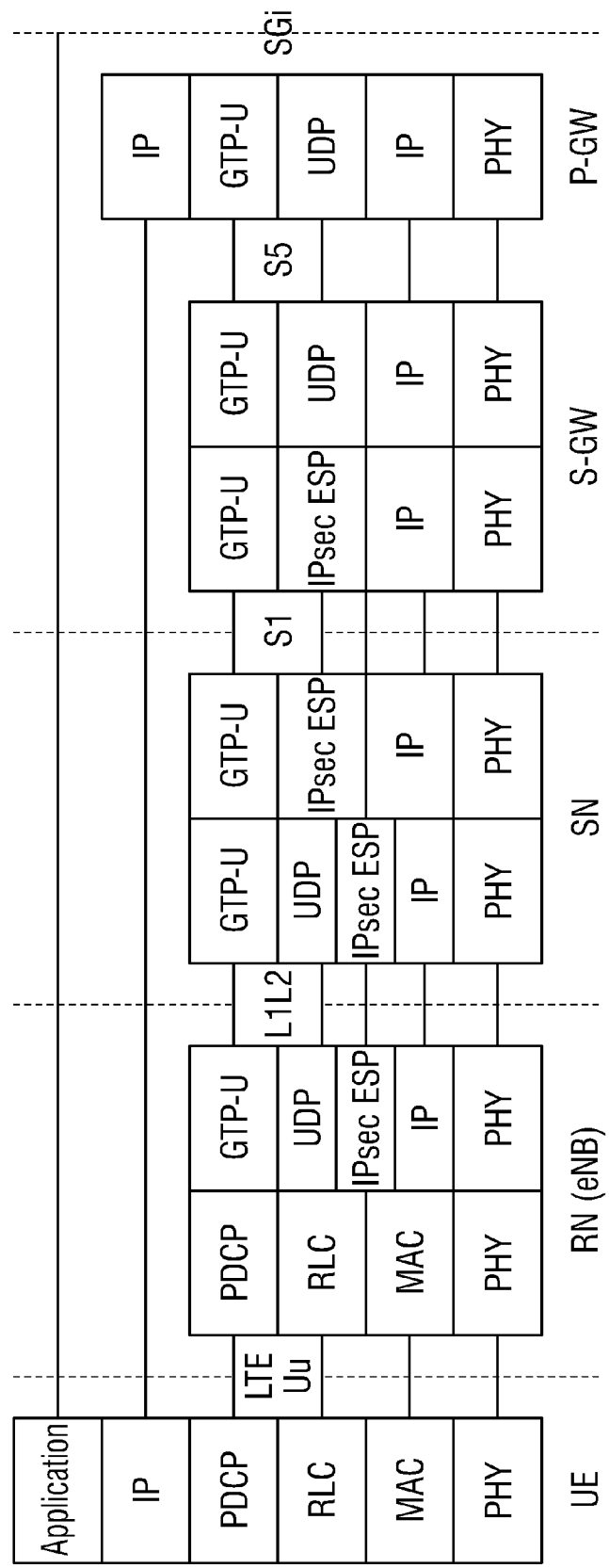

FIGS. 3 and 4 shows one example of a protocol stack that may be employed for the control plane and the user plane, respectively, used in the system of FIGS. 1 and 2 in terms of the OSI (Open Systems Interconnection) model of logical layers. As is known in the art, the Non-Access Stratum (NAS) layer protocol is responsible for signaling and traffic between UE and the network for control purposes such as network attach, authentication, setting up of bearers, and mobility management. The Radio Resource Control (RRC) protocol is responsible for control plane signaling between a UE and the network, i.e. such tasks as broadcast of system information; establishment, maintenance and release of RRC connection; establishment, configuration, maintenance and release of signaling and data radio bearers; security functions including key management; mobility functions such as control of UE cell selection/reselection; paging; UE measurement configuration, processing and reporting; handover; quality of service (QoS) management functions; UE measurement reporting and control of the reporting, but not exclusively. The Packet Data Control Protocol (PDCP) layer is responsible for (de-) compressing the headers of user plane IP packets. The Radio Link Control (RLC) layer is used to format and transport traffic and a Medium Access Control (MAC) layer provides addressing and channel access control mechanisms. The physical (PHY) layer, translates logical communication requests into hardware-specific operations such as modulation, bit synchronization, multiplexing, equalization, forward error correction etc.

Protocol layers that may be employed between the services node 130 and the radio nodes 115 and between the services node 130 and the S-GW 215 may include an Internet Protocol (IP) layer, an Internet Protocol Security Encapsulating Security Payload (IPSec ESP) layer for signing and encrypting packets, a user datagram protocol (UDP) and a GPRS Tunneling Protocol-User plane (GTP-U) for creating IP-based tunnels.

As previously mentioned, a major challenge in a multi-cell deployment is cell-edge performance. For instance, a UE at the cell-edge experiences significant interference from the downlink (DL) transmissions of adjacent radio nodes in decoding the DL transmissions from its serving cell. Likewise, uplink transmissions from a cell-edge user can cause significant interference to adjacent radio nodes. As a result the cell-edge spectral efficiency is significantly poorer than that in the interior of the cell. Several coordination mechanisms have been introduced into the LTE standard to improve cell-edge performance.

One such coordination mechanism is Coordinated Multi-Point or CoMP technology, which has been introduced to improve cell-edge spectral efficiency. As previously mentioned, CoMP is included in Release 11 of the 3GPP Long Term Evolution (LTE) specification. These schemes involve coordination among multiple sectors/cells co-located at a single radio node or coordination among geographically separated radio nodes.

The CoMP transmission schemes that have been proposed may be divided into two primary categories: Joint Processing (JP) and Coordinated Scheduling/Beamforming (CS/CB). Joint processing includes joint transmission, in which the data for a UE is available in a given time-frequency resource (e.g., a resource block) from more than one transmitting cell. Likewise, joint processing also includes joint reception, in which multiple cells receive the same transmission from a single UE on a given time-frequency resource. The physical layer information received by each cell is sent up to a common point, and the data is soft combined as part of the decoding process to result in effective signal-to-noise (SNR) improvements.

Figure 5:
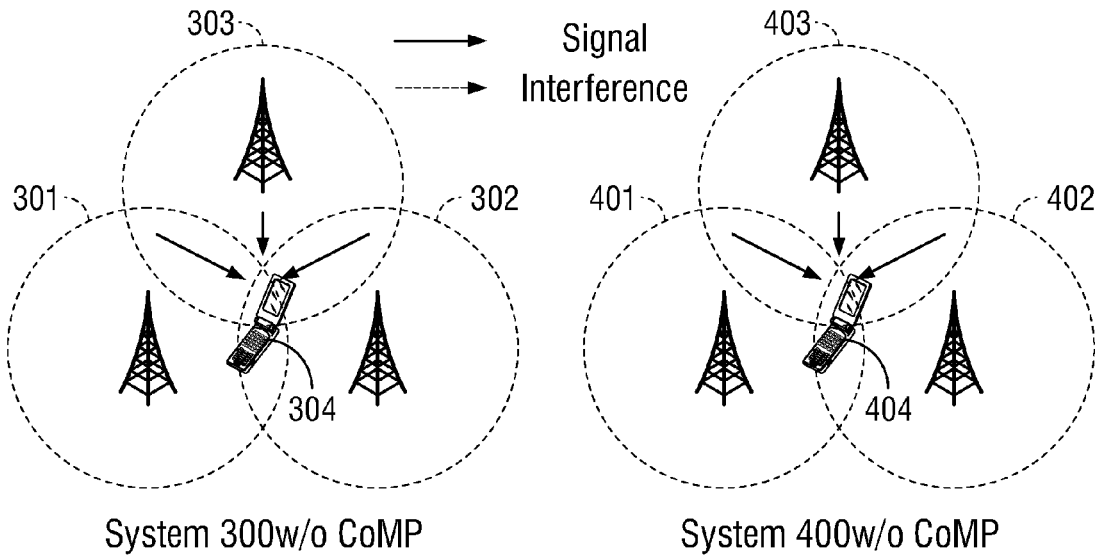
FIG. 5 shows an example of a downlink transmission in a system with joint transmission and a system without joint transmission.

FIG. 5 shows an example of a downlink transmission in a system 300 without joint transmission and a system 400 with joint transmission. In system 300 a UE 304 is located at the edge of three cells 301, 302 and 303. As the solid arrow indicates, only cell 301 is involved in data transmission to the UE 304. However, as the dashed arrows indicate, UE 304 receives interference from cells 302 and 303. In system 400, the UE 404 is located at the edge of three cells 401, 402 and 403. In this case however, the UE 404 receives joint transmission from all three cells 401, 402 and 403. System 400 can achieve increased gain and a signal-to-noise ratio as a result of the diversity gain provided by the three cells 401, 402 and 403.

The presence of the services node 130 enables use of a hybrid joint processing technique. Hybrid joint processing may be implemented as a modification of Joint Processing as described in 3GPP Release 11. As described in more detail below, the modification entails splitting processing between the small cell radio nodes 115 and the services node 130 shown in FIG. 1.

In one implementation the use of hybrid joint processing may be limited to cell-edge UEs and the joint transmission and joint reception endpoints are located at the services node. For example, in the downlink, for cell-edge UEs, the L2 stack (PDCP/RLC/MAC) may be hosted on the services node 130 while the L1 processing (PHY) remains on the radio nodes 115 (see the user plane protocol stack in FIG. 4). Downlink data (i.e., PDSCH—Physical Downlink Shared Channel) may be scheduled for simultaneous transmission from multiple cells using UE-specific reference signals. These scheduling decisions can be made by the centralized scheduler 235 disposed at the services node 130 and the decisions may then be communicated to the MAC schedulers in the individual radio nodes 115. Note that the PDCCH (Physical Downlink Control Channel) would be sent from a single radio node (e.g., the serving radio node) only since the channel estimates for PDCCH decoding are derived from cell-specific reference signals and these are different for different radio nodes.

In another implementation, the use of hybrid joint processing may be limited to QoS-sensitive low data rate services like VoIP. In this case the L2 protocol stack for VoIP users could always be hosted at the services node whether or not the user is in the interior of a cell or at the edge of a cell. When at a cell edge, the macro diversity benefits of joint processing involving multiple cells can be exploited.

Figure 6:
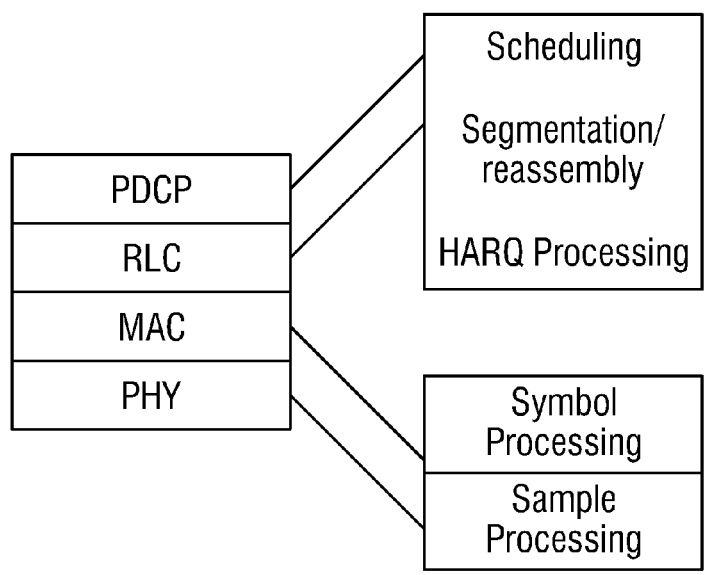
FIG. 6 shows some of the functionality performed by the L2 portion of the OSI protocol stack along with the PHY layer.

FIG. 6 shows some of the functionality performed by the L2 stack along with the PHY layer. As shown, the MAC layer performs such functions as scheduling, segmentation/reassembly and HARQ processing. The PHY layer performs symbol processing and sample processing.

With the MAC layer residing on the services node 130, the latency between the radio nodes 115 and the services node 130 may be larger than the fastest HARQ (Hybrid Automatic Repeat Request) turn-around time of 8 ms. Hybrid Automatic Repeat reQuest (HARQ) is an error control method for data transmission which uses acknowledgments and timeouts to achieve reliable data transmission. By using HARQ, the user data can be transmitted multiple times. For each transmission or retransmission either the same (Chase combining) or potentially a different redundancy version (incremental redundancy) is sent. When a corrupted packet is received, the receiver saves the soft information, requests a retransmission by sending a negative acknowledgement and later combines the already received soft information with the soft information conveyed in the retransmissions to recover the error-free packet as efficiently as possible. By doing so it essentially accumulates the energy of all transmissions and retransmissions. Typically, after a few HARQ retransmissions the data is successfully received.

Because the latency can extend beyond the HARQ turnaround time, hosting the L2 stack on the services node would be feasible for lower data rate users that can tolerate larger HARQ delays (It is noted that DL HARQ is asynchronous and thus retransmissions may be delayed) or those that can operate without HARQ retransmissions (e.g., VoIP users configured to have very low first-transmission block error rates (BLER)).

In the uplink, for cell-edge UEs, the L2 stack may again be hosted on the services node 130 while the L1 processing remains on the radio nodes 115. The centralized scheduler 235 may instruct multiple radio nodes 115 to simultaneously decode a UE's transmission and these scheduling decisions are communicated to the individual schedulers 240 in the radio nodes. The decoded MAC PDUs (Protocol Data Unit) may be delivered separately from the individual radio nodes to the MAC layer in the L2 stack at the services node.

The MAC layer on the services node 130 will typically need to be enhanced to perform de-duplication of MAC PDUs before HARQ retransmissions. The benefit of macro-diversity is that a HARQ retransmission may be avoided even if only one among the multiple radio nodes successfully decodes the UL transmission from the UE. It is noted that this is unlike HSUPA (High Speed Uplink Packet Access), where the de-duplication and reordering operations are performed in the MAC-es layer in the RNC (Radio Network Controller) after HARQ retransmissions.

With the MAC layer residing on the services node, the latency between the radio nodes and the services node may be larger than the fastest HARQ turn-around time of 8 ms. While retransmissions on the uplink are synchronous (e.g., 8 ms periodicity), the UE can be instructed by the eNodeB to not retransmit by signaling an ACK on the PHICH channel but not sending any UL control information using DCI format 0 over PDCCH. The retransmission could thus be delayed from 8 ms to a higher value in increments of 8 ms i.e., 16 ms, 24 ms etc. Similar to downlink, since the HARQ delays are larger, such a hybrid joint processing scheme would benefit delay-tolerant users with lower data rates or those that could operate without HARQ retransmissions (e.g., VoIP users configured to have very low first-transmission BLER)

Figure 7:
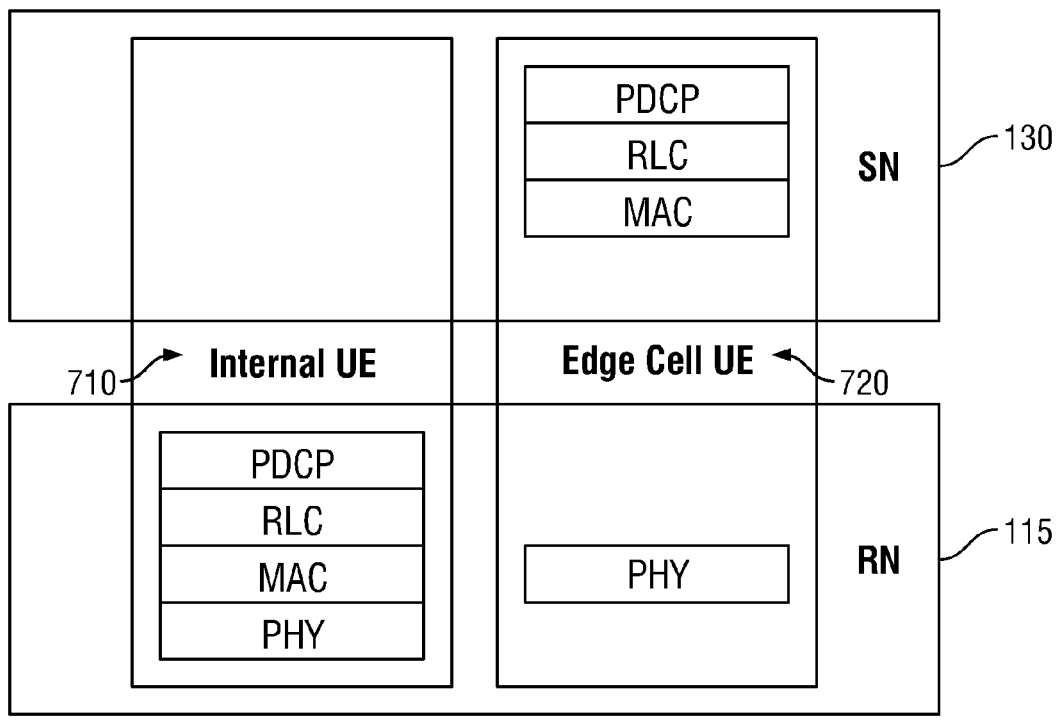
FIG. 7 shows the location of portions of the protocol stack performed on the services node and the radio nodes when hybrid joint processing is employed (e.g. for cell-edge UEs) and when hybrid joint processing is not employed (e.g., for cell-interior UEs).

In one illustrative example, hybrid joint processing techniques may be implemented using the protocol stacks shown in FIG. 7. Here, hybrid joint processing may be used with cell-interior UEs 710 handled through an L2 stack in the radio nodes 115 of the individual cells and cell-edge UEs 720 may be handled through the centralized L2 stack in the services node 130.

Figure 8:
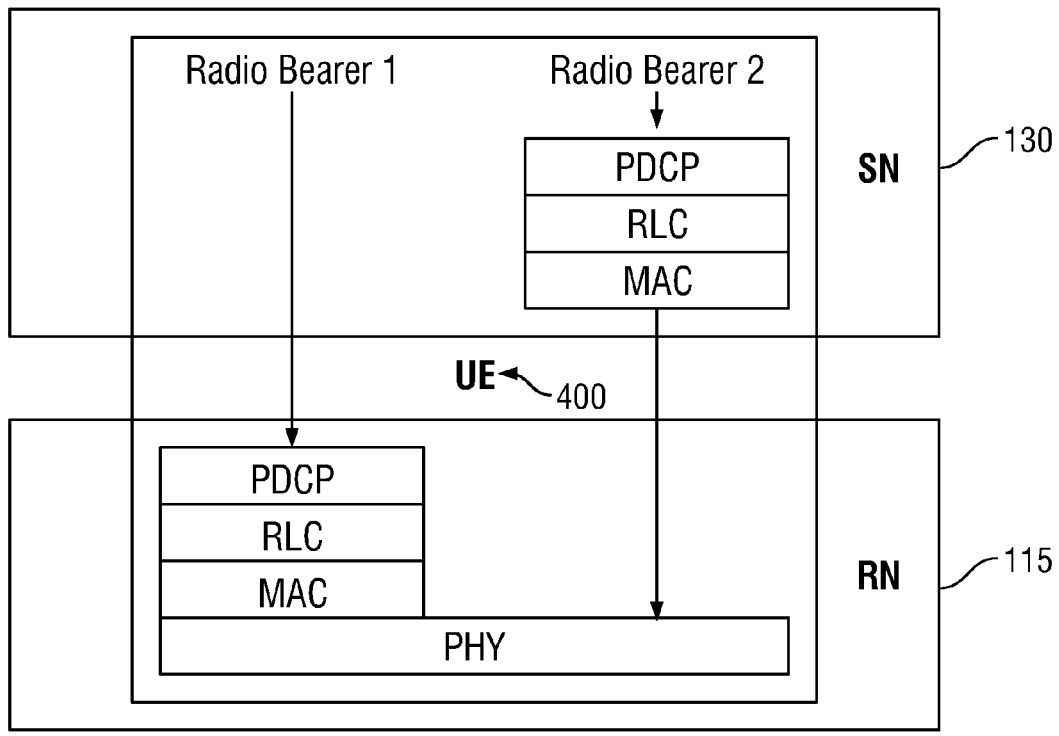
FIG. 8 shows the location of portions of the protocol stack performed on the services node and the radio nodes when hybrid joint processing is employed for UEs with different data radio bearers.

In another illustrative example, for UEs with different data radio bearers (RBs), the PDCP and RLC entities associated with a QoS-sensitive radio bearer (e.g., VoIP) can be handled at the services node, while these entities corresponding to QoS-insensitive radio bearers can be handled at the radio node. FIG. 8 show the protocol stack for such a UE 400. When the services node 130 schedules data from the QoS-sensitive RB in a TTI and communicates that to the radio node 115, this data is prioritized and no data from other RBs corresponding to this user would be scheduled during this TTI by the radio node. Data from different radio bearers can thus be time-multiplexed to provide better QoS through hybrid joint processing only for some RBs of a given user.

As FIG. 7 illustrates, in hybrid joint processing the data protocol processing can be dynamically moved between the services node and radio nodes. Such a dynamic process may be used, for example, for a cell-edge UE that migrates to a cell-interior, or vice versa.

The system can determine the relative position of each active UE based on measurement reports received from the UE. If a UE is determined to be in an area of poor signal quality, and if it is determined that it is necessary to put the UE into a joint processing mode of operation in order to provide the required QoS characteristics, the RAN can start processing the UE's data at the services node. In this case the services node 130, using its central scheduler 235, can allocate scheduling resources on each radio node a few milliseconds ahead of on-air transmission/reception. This allocation of scheduling resources is then signaled to the radio node. On receiving the scheduling allocation for cell-edge UEs, each individual scheduler 240 can be responsible for resource allocation of all other UEs connected to it while avoiding the resources allocated by the central scheduler 235 to cell-edge UEs. That is, in some implementations the central scheduler 235 may be given priority in scheduling radio resources for UEs and the individual radio node schedulers 240 would be required to schedule radio resources in a way that does not conflict with the scheduling of resources by the central scheduler 235 in the services node 130.

The services node 130 also constructs the scheduling downlink control information (DCI), which provides the UE with information used to properly receive and decode the downlink data transmissions. The scheduling DCI, along with an associated timestamp specifying when the DCI is to be transmitted, is sent to the serving cell by the services node 130. In turn, the radio node 115 associated with the serving cell 130 transmits the scheduling DCI to the UE at the time specified by the timestamp.

Figure 9:
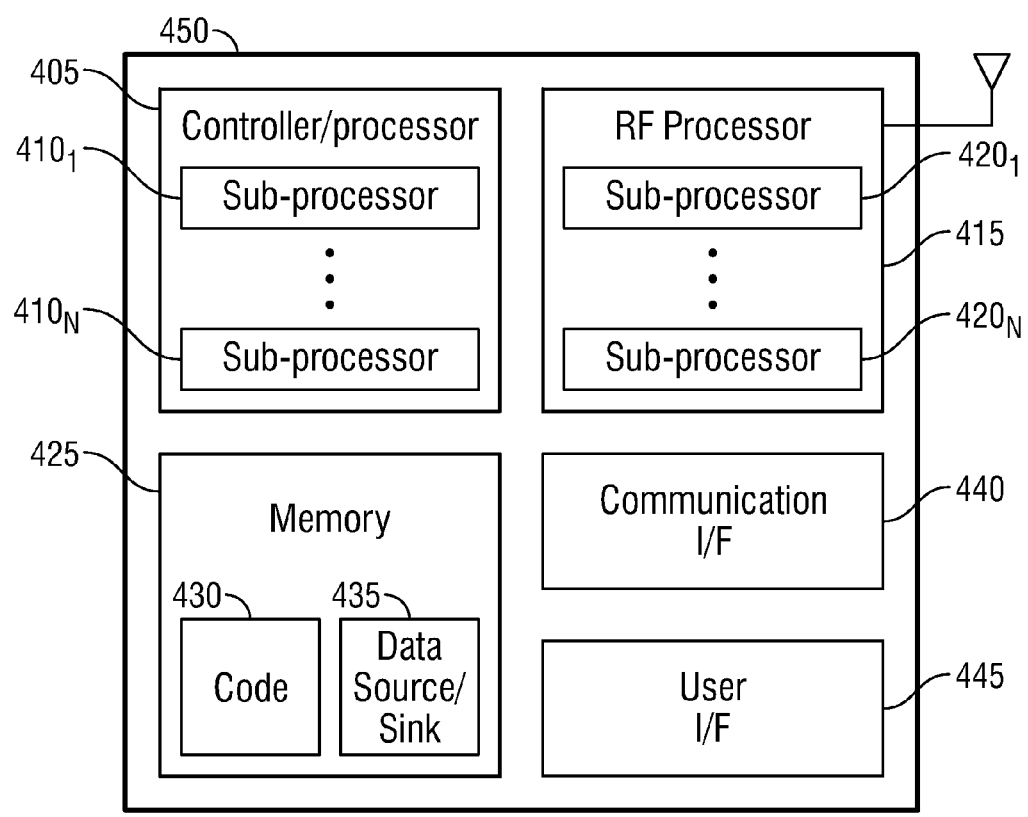
FIG. 9 shows a simplified functional block diagram of illustrative hardware infrastructure for a radio node that may be utilized to implement the present hybrid joint processing scheme.

FIG. 9 shows a simplified functional block diagram 450 of illustrative hardware infrastructure for a radio node that may be utilized to implement the present hybrid joint processing scheme. A controller/processor 405 typically handles high level processing. The controller/processor 405 may include one or more sub-processors 410 or cores that are configured to handle specific tasks or functions. An RF processor 415 implements various signal processing functions including the lower level L1 processing. The RF processor 415 may include one or more sub-processors 420 or cores that are configured to handle specific tasks or functions. A memory 425 stores computer-readable code 430 that is executable by one or more processors in the controller/processor 405 and/or the RF processor 415. The memory 425 may also include various data sources and data sinks (collectively represented by element 435) that may provide additional functionalities. The code 430 in typical deployments is arranged to be executed by the one or more processors to implement the hybrid joint processing scheme by modifying the MAC layer in order to distribute the scheduling functionality between the radio node and the services node.

The hardware infrastructure may also include various interfaces (I/Fs) including a communication I/F 440 which may be used, for example, to implement a link to the services node 130 (FIG. 1), LAN, or to an external processor, control, or data source. In some cases, a user I/F 445 may be utilized to provide various indications such as power status or to enable some local control of features or settings. It is noted that the block diagram 400 may also be substantially applicable to a services node that may be utilized to implement the present hybrid joint processing scheme. More particularly, the RF processor 415 may be eliminated in some applications and any functionality that it provides that is needed to implement the services node may be provided by the controller/processor 405.

Several aspects of telecommunication systems will now be presented with reference to various apparatus and methods described in the foregoing detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionalities described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable media. Computer-readable media may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable media for storing or transmitting software. The computer-readable media may be resident in the processing system, external to the processing system, or distributed across multiple entities including the processing system. Computer-readable media may be embodied in a computer-program product. By way of example, a computer-program product may include one or more computer-readable media in packaging materials. Those skilled in the art will recognize how best to implement the described functionality presented throughout this disclosure depending on the particular application and the overall design constraints imposed on the overall system.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of joint processing of data in a radio access network (RAN) that includes a plurality of radio nodes each associated with a cell and a services node operatively coupled to the radio nodes, the services node providing connectivity to a core network, comprising:

determining that a plurality of first UEs (User Equipment) each being serviced by a selected set of the cells is to operate in accordance with a hybrid joint processing scheme; and transferring information between the plurality of first UEs and the radio nodes in accordance with the hybrid joint processing scheme by performing L1 layer processing on the radio nodes and L2 layer processing at the services node, wherein the L1 layer processing operates in accordance with the Open Systems Interconnection (OSI) model and includes physical (PHY) layer processing that translates logic communication request into hardware-specific operations and the L2 layer processing operates in accordance with the OSI model and includes Packet Data Control Protocol (PDCP) layer processing, Radio Link Control (RLC) layer processing and Medium Access Control (MAC) layer processing.

2. The method of claim 1 further comprising determining that a plurality of second UEs each being serviced by one of the cells does not operate in accordance with a hybrid joint transmission scheme.

3. The method of claim 2 wherein the plurality of first UEs are cell-edge UEs.

4. The method of claim 3 wherein the plurality of second UEs are cell-interior UEs.

5. The method of claim 2 wherein the plurality of first UEs are UEs having at least a specified QoS level.

6. The method of claim 4 further comprising distinguishing between cell-edge UEs and cell-interior UEs using measurement reports received from the UEs.

7. The method of claim 2 further comprising:
determining a first allocation of radio resources at the services node for use by the plurality of first UEs; and
transmitting scheduling information reflecting the first allocation of radio resources to the radio nodes associated with the selected cells operating in accordance with the hybrid joint processing scheme.

8. The method of claim 7 further comprising determining a second allocation of radio resources at one or more of the radio nodes for use by the plurality of second UEs, wherein the radio resources allocated by the services node have priority over the radio resources allocated by the one or more radio nodes.

9. The method of claim 1 further comprising sending downlink control information (DCI) and a timestamp to radio nodes associated with serving cells to which respective ones of the first UEs are attached, the radio nodes receiving the DCI and the timestamp and transmitting the DCI to the first UEs attached to the serving cells respectively associated with each of the radio nodes at times specified by the timestamps.

10. The method of claim 1 further comprising determining that at least one of the first UEs is no longer operating in accordance with the hybrid joint processing scheme, and in response thereto, performing the L1 and L2 processing on the radio node serving the at least one of the first UEs.

11. The method of claim 1 wherein at least one of the first UEs has first and second radio bearers, the first radio bearer operating in accordance with the joint processing scheme and the second radio bearer not operating in accordance with the joint processing scheme.

12. The method of claim 11 wherein the first radio bearer supports QoS-sensitive data.

13. The method of claim 12 wherein the second radio bearer supports QoS-insensitive data or data is relatively less QoS-sensitive than the data supported by the first radio bearer.

14. The method of claim 11 further comprising time-multiplexing data supported by the first radio bearer and the second radio bearer.

15. A radio node operable in a cell in a small cell radio access network (RAN), comprising:
one or more processors;
an RF (radio frequency) transceiver operatively coupled to the one or more processors and arranged for bidirectional communications with a plurality of UEs (user equipment); and
memory operatively coupled to the one more processors, the memory storing computer-readable instructions which, when executed by the one or more processors, implement a method comprising:
upon a determination by the RAN that a plurality of first UEs (User Equipment) each being serviced by the radio node is to operate in accordance with a hybrid joint processing scheme, transmitting information to and/or receiving information from the plurality of first UEs in accordance with a hybrid joint processing scheme by performing L1 layer processing and allowing L2 layer processing to be performed by a services node operatively coupled to the radio node, the services node providing connectivity to a core network, wherein the L1 layer processing operates in accordance with the Open Systems Interconnection (OSI) model and includes physical (PHY) layer processing that translates logic communication request into hardware-specific operations and the L2 layer processing operates in accordance with the OSI model and includes Packet Data Control Protocol (PDCP) layer processing, Radio Link Control (RLC) layer processing and Medium Access Control (MAC) layer processing.

16. The radio node of claim 15 wherein the memory implements a method further comprising performing physical layer sampling.

17. The radio node of claim 15 wherein the plurality of first UEs are cell-edge UEs.

18. The radio node of claim 15 wherein the memory implements a method further comprising:
receiving scheduling information from the services node reflecting a first allocation of radio resources for use by the first plurality of UEs operating in accordance with the hybrid joint processing scheme; and
determining a second allocation of radio resources for use by a plurality of second UEs that do not operate in accordance with the hybrid joint transmission scheme, wherein the first allocation of radio resources allocated by the services node has priority over the second allocation of radio resources.

19. The radio node of claim 15 wherein the memory implements a method further comprising:
receiving from the services node downlink control information (DCI) and a timestamp; and
transmitting the DCI to the first UEs at times specified by the timestamps.

20. The radio node of claim 15 wherein the memory implements a method further comprising, upon a determination that at least one of the first UEs is no longer to operate in accordance with the hybrid joint processing scheme, performing both the L1 and L2 processing for the at least one of the first UEs.

21. A radio node operable in a cell in a small cell radio access network (RAN), comprising:
one or more processors;

an RF (radio frequency) transceiver operatively coupled to the one or more processors and arranged for bidirectional communications with a plurality of UEs (user equipment); and memory operatively coupled to the one more processors, the memory storing computer-readable instructions which, when executed by the one or more processors, implement a method comprising:
- upon a determination by the RAN that a plurality of first UEs (User Equipment) each being serviced by the radio node is to operate in accordance with a hybrid joint processing scheme, transmitting information to and/or receiving information from the plurality of first UEs in accordance with a hybrid joint processing scheme by performing L1 layer processing and allowing L2 layer processing to be performed by a services node operatively coupled to the radio node, the services node providing connectivity to a core network;
- receiving from the services node downlink control information (DCI) and a timestamp; and
- transmitting the DCI to the first UEs at times specified by the timestamps.

22. The radio node of claim 21 wherein the memory implements a method further comprising performing physical layer sampling.

23. The radio node of claim 21 wherein the plurality of first UEs are cell-edge UEs.

24. The radio node of claim 21 wherein the memory implements a method further comprising:
- receiving scheduling information from the services node reflecting a first allocation of radio resources for use by the first plurality of UEs operating in accordance with the hybrid joint processing scheme; and
- determining a second allocation of radio resources for use by a plurality of second UEs that do not operate in accordance with the hybrid joint transmission scheme, wherein the first allocation of radio resources allocated by the services node has priority over the second allocation of radio resources.

* * * * *